United States Patent [19]
Thebault et al.

[11] Patent Number: 5,411,762
[45] Date of Patent: May 2, 1995

[54] METHOD OF OBTAINING A SIALON-BASED CERAMIC MATERIAL BY REDUCING AN ALUMINOSILICATE MATERIAL, AND USE THEREOF IN FORMING A CERAMIC COATING ON A REFRACTORY SUBSTRATE

[75] Inventors: Jacques Thebault, Bordeaux; Alain Seron, Viennes en Val; Francois Beguin, Olivet, all of France

[73] Assignee: Societe European De Propulsion, Suresnes, France

[21] Appl. No.: 190,319

[22] Filed: Feb. 2, 1994

[30] Foreign Application Priority Data

Feb. 8, 1993 [FR] France ................. 93 01360

[51] Int. Cl.⁶ .................. B05D 3/04; C04B 35/599
[52] U.S. Cl. .................. 427/226; 427/255; 427/255.4; 423/344; 423/412; 423/327.1; 501/98
[58] Field of Search ............ 423/344, 412, 327.1; 427/226, 255, 255.4; 501/98

[56] References Cited

U.S. PATENT DOCUMENTS

| | | | |
|---|---|---|---|
| 4,360,506 | 11/1982 | Paris et al. | 423/327.1 |
| 4,975,260 | 12/1990 | Imai et al. | 423/412 |
| 4,977,113 | 12/1990 | Phelps et al. | 501/98 |
| 5,108,967 | 4/1992 | Phelps et al. | 423/327.1 X |
| 5,110,773 | 5/1992 | Corral et al. | 501/98 |

FOREIGN PATENT DOCUMENTS 0023869 2/1981 European Pat. Off..
0290076 11/1988 European Pat. Off..

OTHER PUBLICATIONS

Chemical Abstracts, vol. 116, No. 22, Jun. 1, 1992, Columbus Ohio, US Hanaoka Osamu & Al "Manufacture of Silicon Nitride", Abstract No. 220230d.
Database WPI, Week 9221, Derwent Publications Ltd., London, GB; AN 92-170066 & JP-A-4 091 226 (Toshiba Ceramics Co.) 24 Mar. 1992.
Database WPI, Week 9105, Derwent Publications Ltd., London, GB; AN 91-032091 & JP-A-2 300 319 (Toshiba Ceramics KK) 12 Dec. 1990.

*Primary Examiner*—Karl Group
*Attorney, Agent, or Firm*—Weingarten, Schurgin, Gagnebin & Hayes

[57] ABSTRACT

A ceramic material based on Sialon, in particular on $\beta'$-Sialon is obtained by reducing an aluminosilicate precursor by means of a gas phase comprising a mixture of hydrogen and nitrogen doped with a gaseous carbon compound. The gaseous carbon compound is a gas containing carbon in combined form, e.g. an alkane, and its concentration by volume in the gas is less than 3%. The method is particularly suitable for forming Sialon-based coatings on substrates that are solid or fibrous. For composite materials constituted by a fiber preform densified by means of a matrix, the method can be used to form an interphase coating on the fibers of the preform prior to densifying the preform, or the method can be used to form a matrix that is based on Sialon.

17 Claims, 3 Drawing Sheets

$N_2 + H_2 + CH_4$ $N_2 + H_2$

METHOD OF OBTAINING A SIALON-BASED CERAMIC MATERIAL BY REDUCING AN ALUMINOSILICATE MATERIAL, AND USE THEREOF IN FORMING A CERAMIC COATING ON A REFRACTORY SUBSTRATE

The present invention relates to obtaining a Sialon-based ceramic material, i.e. a ceramic material containing a major part of Sialon. The term "Sialon" is used to designate a material belonging to the system comprising silicon, aluminum, oxygen, and nitrogen (Si, Al, O, N).

BACKGROUND OF THE INVENTION

Sialon-based ceramic materials are well known for their good mechanical and physicochemical properties, in particular their good resistance to a corrosive atmosphere (in particular in an oxidizing environment).

Various methods are known for making Sialon, mostly for obtaining solid parts.

Known methods generally make use either of direct synthesis from a mixture of powders, or else they make use of reduction of an aluminosilicate material.

For direct synthesis, a mixture of powdered silicon nitride, aluminum nitride, silica, and alumina ($Si_3N_4$, AlN, $SiO_2$, and $Al_2O_3$) is compacted under high pressure and is sintered at very high temperature (1700° C. to 1800° C.). Sintering may be performed under load, or with an incorporated additive such as yttrium oxide ($Y_2O_3$). That method suffers from the drawbacks of requiring raw materials that are quite expensive, and of requiring treatment at very high temperature. In addition, although it is suitable for obtaining parts that are dense, it is unsuitable for forming Sialon-based coatings on substrates.

Several methods of obtaining Sialon by reducing an aluminosilicate material make use of carbon as a reducing agent. The aluminosilicate material may be constituted by a mechanical mixture of oxides such as silica and alumina, or by a synthetic mixture, e.g. obtained by the sol-gel technique, or else by a natural mixture, in particular a compound selected from those known overall under the term "clays".

Reduction by means of carbon requires intimate contact between the aluminosilicate material and the carbon. This can be obtained by intimately mixing the precursor with carbon powder (carbon black) or chemically by using insertion compounds. In the latter case, the precursor used is a clay whose characteristic scaly structure makes it possible to insert organic molecules (e.g. acrylonitrile) between scales, which molecules, after being subjected to pyrolysis, constitute the source of carbon required for reduction. Which method makes it possible, by carbon reduction, to obtain a $\beta$-Sialon at a temperature (about 1100° C.) that is lower than the temperature required (about 1350° C. to 1450° C.) when starting from a mechanical mixture of aluminosilicate material and of carbon powder.

A drawback of the above carbon reduction methods lies in the difficulty of accurately controlling the carbon content, and thus the amount of reduction. Another drawback, that results from the inclusion of carbon in the starting compound, consists in the resulting ceramic being porous because of the inevitable evolution of carbon monoxide during reduction.

Other known methods propose obtaining a Sialon by reducing an aluminosilicate material by means of ammoniac ($NH_3$) or a mixture of ammoniac and hydrogen $H_2$. As before, the precursor may be a mechanical mixture of $SiO_2$ and $Al_2O_3$ powders or it may be a clay. Such methods make it possible to work at a temperature of about 1000° C., i.e. a temperature that is lower than those used in carbon reduction. Nevertheless, the Applicant has observed that such methods give rise, in fact, to a ceramic that is essentially constituted not of Sialon, but of a mixture of mullite and of cristobalite.

Finally, other known methods propose using a polyaluminocarbosilane material to obtain Sialon by treatment under ammonia at about 1400° C. to 1500° C., or using mixtures of opalite and ammonium to obtain Sialon by electrical discharge under a nitrogen atmosphere at 1750° C.

OBJECTS AND SUMMARY OF THE INVENTION

An object of the present invention is to provide a novel method of obtaining a ceramic material based on Sialon by reducing an aluminosilicate material.

More particularly, an object of the invention is to provide a method of obtaining $\beta'$-Sialon or mixtures of $\beta'$-Sialon and aluminum nitride in adjustable proportions. The term "$\beta'$-Sialon" is used herein to designate a compound whose general formula is of the form $Si_{6-t}Al_tO_tN_{8-t}$ in which t may lie in the range 0 to 4.2.

Another object of the invention is to provide a method whereby a Sialon-based ceramic can be obtained in various desirable forms: powder; solid part; thick coating; thin film coating; fibers; . . . .

Another object of the invention is to provide a method whereby it is possible to form a dense and adhesive coating on a refractory ceramic substrate, whether the substrate is solid or fibrous, which is not possible with prior art methods.

Another object of the invention is also to provide a method enabling an interphase coating to be formed on the fibers of a fiber preform for use in the manufacture of a part made of composite material, the preform subsequently being densified by a refractory matrix, or else a method enabling a composite material to be made having a matrix that is totally or partially based on Sialon.

According to the invention, these objects, and others, are achieved by means of a method whereby the aluminosilicate material is reduced by a gas phase comprising a mixture of hydrogen and of nitrogen doped by a gaseous carbon compound.

By gaseous carbon compound is meant a compound which contains carbon and which is in gaseous state under the operating conditions of the treatment. By way of non-limiting example, it can obviously be a gas (such as methane) or a liquid which evaporates (such as benzene) or a solid which sublimates or reacts previously with the gaseous phase.

It has been shown that the presence of a gaseous carbon compound in the gas constituted essentially by $H_2$ and $N_2$ is necessary for obtaining aluminosilicate or a mixture of Sialon and AlN. Various gaseous carbon compounds can be used, selected from compounds capable of providing carbon in gaseous form at the temperature at which the method is implemented, i.e. 1100° C. or higher. Such compounds include hydrocarbons, in particular alkanes.

Nevertheless, the concentration of the gaseous carbon compound in the gas must remain limited so that under the conditions of temperature and pressure used, no elemental carbon is formed, whether in powder form (soot, carbon black, . . . ) or in solid form (pyrolytic carbon as obtained by chemical vapor deposition). The gaseous carbon compound is preferably a gas containing carbon in combined form, at a concentration in the gas that is less than 3% by volume.

The use of an $H_2+N_2$ reducing mixture advantageously makes it possible to adjust reducing power by adjusting relative quantities of $H_2$ and of $N_2$. It is thus possible to obtain Sialon or a mixture of Sialon and AlN in adjustable proportions. In general, the volume ratio of $H_2$ to $N_2$, lies in the range 1/10 to 10/1.

The temperature of which the method of the invention is implemented preferably lies in the range 1100° C. to 1400° C. It may be lowered down to 1000° C., i.e. 350° C. to 400° C. lower than the temperature required for the carbon reduction.

The method of the invention has the advantage of enabling a Sialon-based ceramic to be obtained in various different possible forms: a solid ceramic, a coating layer on a refractory substrate, a thin film coating fibers, a matrix in a composite material having reinforcing fibers, or indeed a fiber.

Starting with a mixture of powders, in particular of $SiO_2$ and $Al_2O_3$ or of clay, a powder of Sialon or of Sialon +AlN can be obtained that is suitable for making solid pans by conventional techniques, in particular by sintering.

An advantageous use of the method of the invention lies in forming a Sialon-based coating on a solid or a fibrous refractory substrate. Such a coating may, in particular, constitute a protective layer against oxidizing. By refractory substrate is meant a compound whose melting point is higher than the temperature used for the Sialon formation reaction. In particular, silicon carbide and carbon in the form of composites such as SiC/SiC, C/SiC, C/C etc. When formed on a fibrous substrate, the Sialon-based coating may constitute a matching interphase in a composite material, between its matrix and the fibers of the fibrous substrate used as reinforcement or as a preform for said material.

To form such a coating, the aluminosilicate material is put into suspension in a liquid vehicle, e.g. acetone, an alcohol, or water. The suspension is deposited on the surface of a solid substrate to be coated or it is impregnated within a fibrous substrate. The reduction by means of the $H_2+N_2$ mixture doped with a gaseous carbon compound is performed after the liquid vehicle has been eliminated. Impregnating a fibrous substrate constituting a preform for a composite material thus makes it possible to form a Sialon-based interphase coating on the fibers, or even to constitute a complete matrix based on Sialon. Under such circumstances, a plurality of successive cycles comprising impregnation by suspension, elimination of the liquid vehicle, and reduction treatment may be necessary.

To implement the method of the invention, the aluminosilicate material used may consist in a mechanical mixture of $SiO_2$ and $Al_2O_3$ powders, or in a mixture of such powders obtained in a manner known per se by a sol-gel method, or a clay or a mixture of clays in powder form, or else an aluminosilicate fiber.

Various different clays can be used, such as kaolinite, montmorillonite, kyanite, sillimanite, .... These clays have a lamellar or scaly texture which is partially conserved after transformation into Sialon or Sialon +AlN. In addition, the use of such clays is advantageous for making interphase layers between the matrix and the fiber reinforcement in composite materials, in particular composite materials having a composite matrix. As described in document EP-A-0 172 082, interposing a coating having a lamellar or layered structure between the reinforcing fibers and the matrix enables the mechanical properties of the composite material to be optimized.

When the precursor is constituted by an aluminosilicate fiber, the method of the invention enables it to be transformed into a Sialon fiber or a Sialon +AlN fiber.

BRIEF DESCRIPTION OF THE DRAWINGS

Implementations of the invention are described below by way of non-limiting indication.

Reference is made to the accompanying drawings, in which.

MORE DETAILED DESCRIPTION

The overall scheme for forming Sialon or a mixture of Sialon and AlN by the method of the invention is described below. In this scheme, x, y, and z designate the respective quantities of $H_2$, $N_2$ and gaseous carbon compound, and u, v, and w designate the respective quantities produced of Sialon, of AlN and of water.

Aluminosilicate precursor$+xH_2+yN_2+z$gaseous carbon compound$\rightarrow u$Sialon$+v$AlN$+w H_2O$ This reaction is performed under atmospheric pressure and at a temperature greater than or equal to about 1100° C., and preferably not exceeding 1400° C. The duration of the reaction is several hours.

The aluminosilicate material is a mixture of $SiO_2$ and $Al_2O_3$ powders obtained mechanically or by the sol-gel method, or it is a clay (kaolinite or montmorillonite, for example) or an aluminosilicate fiber.

The relative quantities of $H_2$ and $N_2$ are determined so as to adjust the reducing power as a function of the desired relative proportions of Sialon and AlN in the resulting ceramic. In practice, the respective quantities by volume x and y are in a ratio lying in the range 1 to 3.

The gaseous carbon compound used is an alkane, e.g. methane.

The proportion by volume of the alkane is limited so as to avoid the formation of solid elemental carbon. This proportion is less than 3%, and is preferably less than 1%.

The respective quantities u and v of Sialon and of AlN that are obtained depend on the ratio x/y.

Various examples of the method of the invention are described below.

EXAMPLE 1

Making a Ceramic Powder Constituted by a Mixture of β'-Sialon and of AlN

Figure 1:
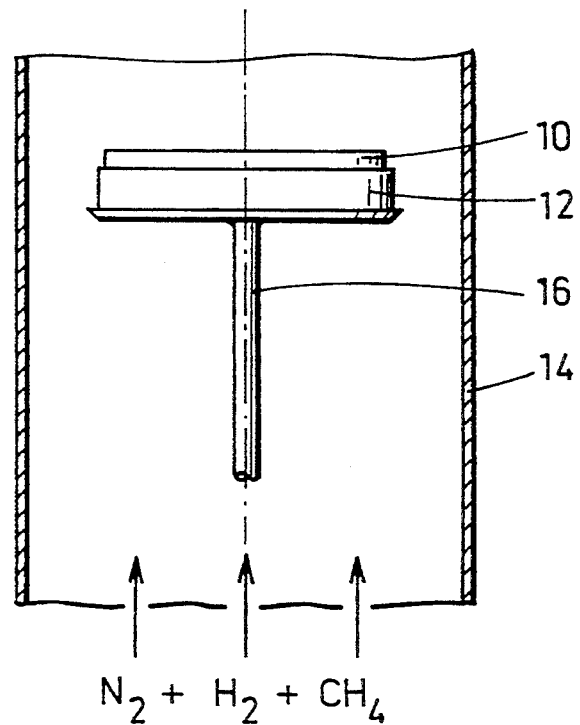
FIG. 1 is a highly diagrammatic illustration of a first implementation of the method of the invention.

In this example, the aluminosilicate material was a mixture of $SiO_2$ and $Al_2O_3$ powders obtained by the sol-gel method, with the atomic ratio between silicon and aluminum (Si/Al) being equal to 2. The precursor 10 was placed on a refractory substrate 12 and was inserted in a kiln 14 on a support 16 (FIG. 1).

The temperature inside the kiln was raised to 1350° C. and a gas containing a mixture of $H_2$, $N_2$, and methane was admitted at the bottom of the kiln. In this gas, the volume ratio of $H_2$ to $N_2$ was equal to 3, and the methane represented 0.3% by volume. The gaseous reaction products were extracted from the top of the kiln.

A continuous flow of gas was maintained for 2 horns, with the pressure in the kiln being equal to atmospheric pressure.

Figure 3:
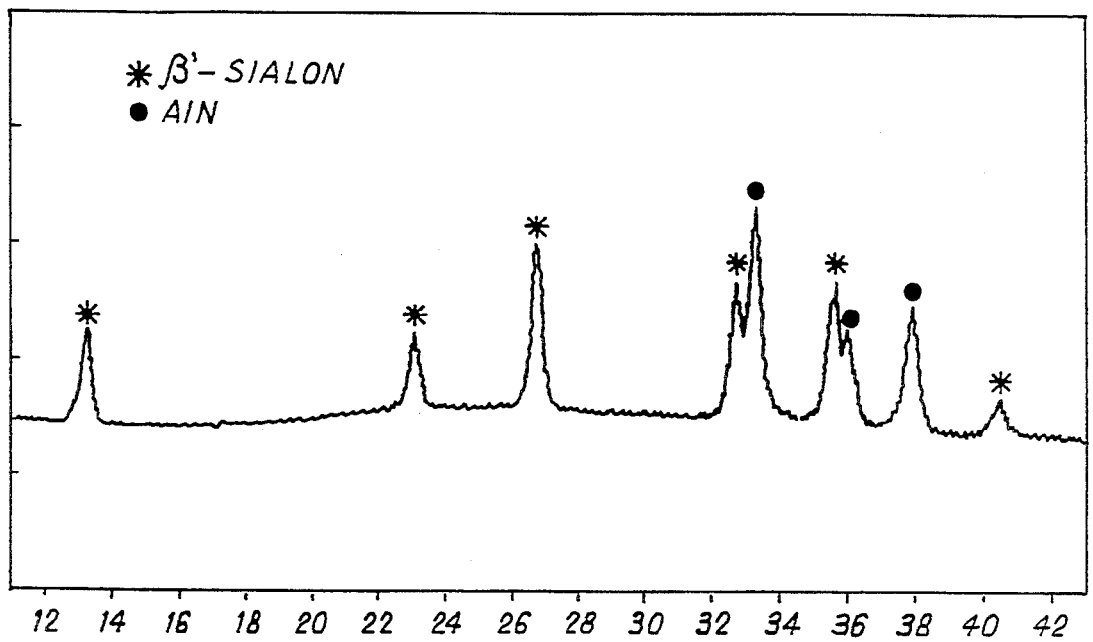
FIGS. 3, 4 and 5 are graphs showing the results of X-ray spectral analysis on materials obtained by methods of the invention and otherwise.

At the end of the reaction, the precursor had been transformed into a ceramic powder constituted by a mixture of $\beta'$-Sialon and of AlN, which has been confirmed by X-ray spectrum analysis (FIG. 3).

Comparative Example 1A

By way of comparison, exactly the same procedure was applied as in Example 1, except that no methane was added in the gas phase.

Figure 4:
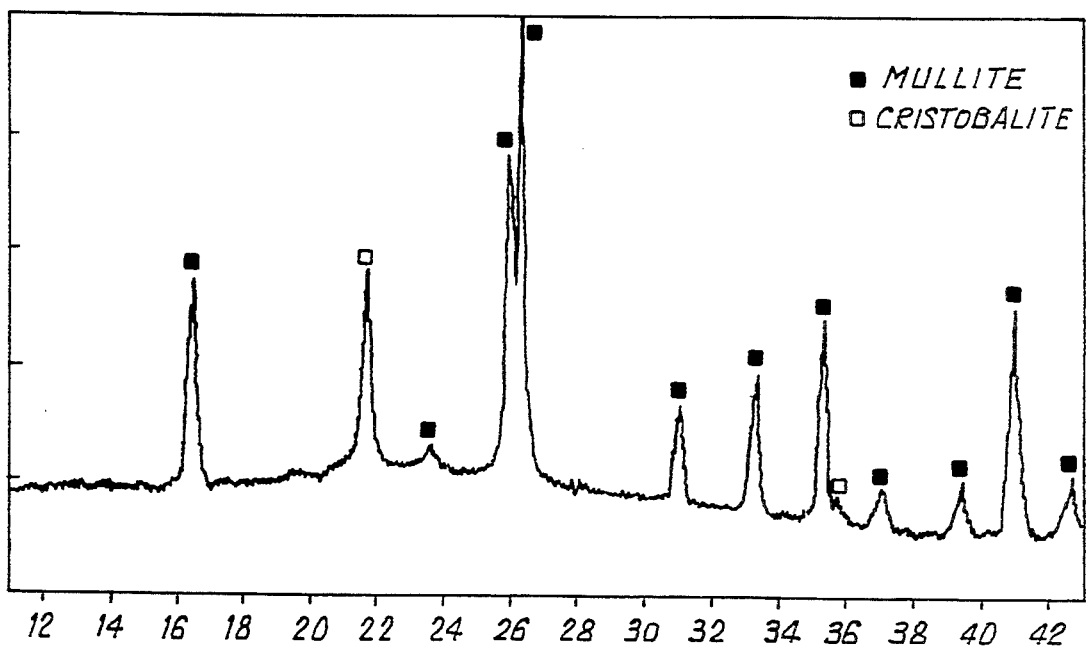

At the end of the reaction, the precursor had been transformed into a mixture of mullite and of cristobalite, with no trace of Sialon being present, as confirmed by X-ray spectrum analysis (FIG. 4).

This example demonstrates that it is necessary for the gaseous carbon compound to be present in the reducing gas.

Comparative Example 1B

By way of comparison, exactly the same procedure was applied as in Example 1, but with methane constituting 3.1% by volume of the gas. At the end of the reaction, a continuous film of carbon was observed to have been formed on the surface of the sample, thereby preventing the formation of $\beta'$-Sialon.

EXAMPLE 2

Figure 2:
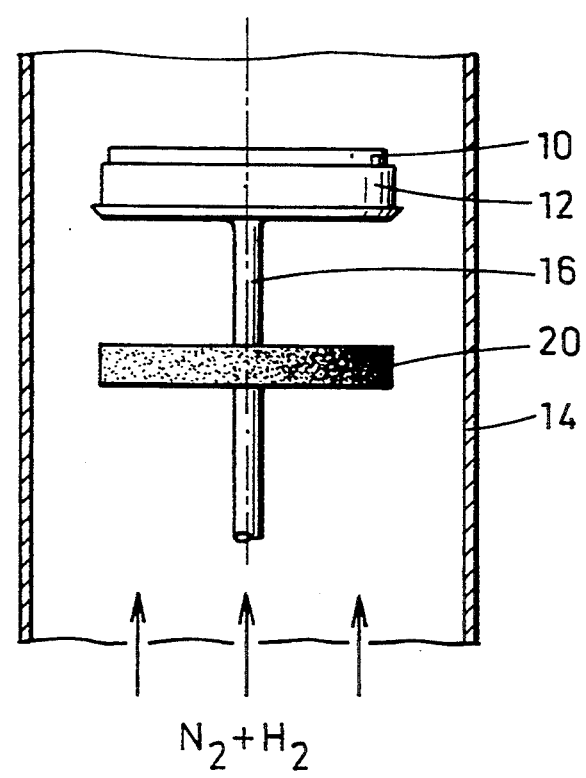
FIG. 2 is a highly diagrammatic illustration of a second implementation of the method of the invention.

The procedure was the same as in Example 1, but the carbon-containing material was constituted by a block of graphite 20 disposed in the kiln 14, upstream from the substrate 12 carrying the precursor 10 (FIG. 2). The gas was constituted by a mixture of $H_2+N_2$ without any added gaseous carbon compound in the starting gas phase.

At the end of the reaction, the precursor had been transformed into a mixture of $\beta'$-Sialon and of AlN, as in Example 1.

By reacting with the hydrogen contained in the gas, the graphite block 20 served to produce the methane required for producing Sialon.

The presence of methane was demonstrated by mass spectrometry.

This example according to the invention illustrates a variant embodiment in which the gas containing carbon is generated in situ by upstream reaction.

EXAMPLE 3

Making a Coating of Compact $\beta'$-Sialon Adhering to a C/SiC Material

A piece of C/SiC composite material (i.e. comprising carbon fiber reinforcement and a silicon carbide matrix) was provided on its silicon carbide outside surface with a coating of $\beta'$-Sialon as follows.

An aluminosilicate material constituted by kaolinite was put in suspension in water and was deposited on the surface of the composite piece to be coated. After the water had evaporated, the piece with its kaolinite coating was treated at 1200° C. for 48 hours in an atmosphere comprising an $H_2/N_2$ mixture (at a volume ratio of $H_2N_2=3/1$) plus 0.3% by volume of methane.

Figure 5:
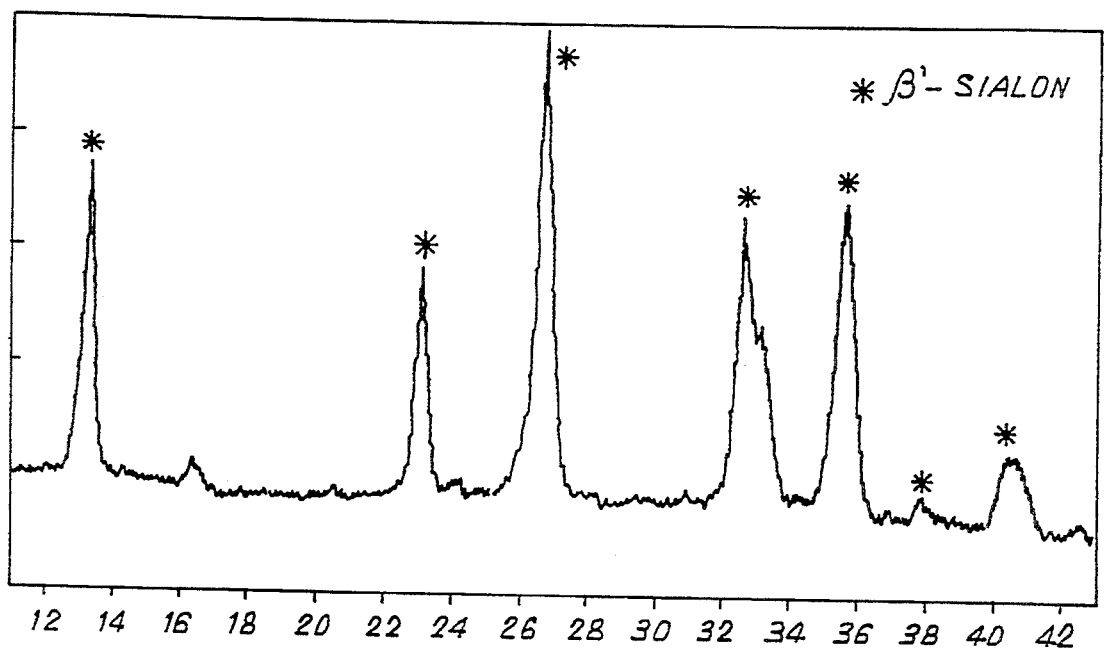

At the end of the treatment, the resulting coating was mainly constituted by $\beta'$-Sialon, as confirmed by X-ray spectrum analysis (FIG. 5). A compact coating was thus obtained adhering to the C/SiC substrate and having a regular thickness of about 50 microns.

In addition, it was observed that the coating based on $\beta'$-Sialon had conserved the scaly appearance of the precursor clay.

EXAMPLE 4

Making Fibers Constituted Mostly of $\beta'$-Sialon

The aluminosilicate precursor was an aluminosilicate fiber of the type sold by the US 3M company under the name Nextel 440. The fiber was treated at 1200° C. for 24 hours in an atmosphere comprising an $H_2/N_2$ mixture (in a volume ratio $H_2/N_2=3/1$) plus 0.3% by volume of methane. After treatment, fiber was obtained constituted for the most part by $\beta'$-Sialon.

EXAMPLE 5

Making an Interphase Coating on an SiC Fiber Preform

In this example, the fibers of a substrate or preform made of SiC fibers were to be provided with a thin interphase coating of Sialon-based ceramic prior to the preform being densified by a matrix to constitute a piece of composite material.

The preform was of fibers based on silicon carbide such as the fibers sold under the name Nicalon NL202 by the Japanese Nippon Carbon company.

The precursor was a kaolinite type clay put into suspension in water. The SiC fiber preform was impregnated with the suspension. After excess water had been eliminated by evaporation, the preform was treated under the same conditions as in Example 3.

After treatment, the fibers were individually coated with a ceramic film constituted for the most part of Sialon, and retaining the scaly structure of the initial clay.

A preform coated in this way can be densified with a matrix, e.g. a ceramic matrix. Densification can be performed in conventional manner, in particular by chemical vapor infiltration such as SiC or by impregnation using a liquid composition containing a precursor for the matrix, for example polycarbosilane, and then by transformation of the precursor.

In composite materials obtained in this way, the Sialon-based ceramic film formed on the fibers acts as an interphase between the fibers and the matrix and it serves, in particular because of its scaly structure, to deflect cracks that propagate through the matrix as far as the interphase and to relax stresses at the bottoms of the cracks. The interphase thus improves resistance to shock while still ensuring the necessary transfer of load between the matrix and the fibers.

In this example, the purpose of impregnating the fiber preform with a suspension of kaolinite is to obtain a thin interphase coating on the fibers. By repeating the stages of impregnation with the suspension, evaporation of the water, and reduction, until the preform has been densified as completely as possible, it is possible to obtain a composite material of ceramic nature constituted for the most part by Sialon.

We claim:

1. A method of obtaining a Sialon-based ceramic material, comprising the steps of providing an aluminosilicate material and reducing said aluminosilicate material, wherein the aluminosilicate material is reduced by a gas phase comprising a mixture of hydrogen and of nitrogen doped with a gaseous carbon compound, with said aluminosilicate material remaining substantially free of solid elemental carbon.

2. The method according to claim 1, wherein said aluminosilicate is reduced by a gas phase containing the gaseous carbon compound at a concentration of less than 3% by volume.

3. A method according to claim 1, wherein the gaseous carbon compound is a hydrocarbon.

4. A method according to claim 1, wherein the gaseous carbon compound is an alkane.

5. A method according to claim 1, wherein the volume ratio of hydrogen to nitrogen in the gas lies in the range 1/10 to 10/1.

6. The method according to claim 1, wherein said reducing step is carried out at a temperature of not less than 1100° C.

7. The method according to claim 1, wherein said reducing step is carried out by placing the aluminosilicate material in an enclosure and admitting into said enclosure a flow of gas comprising said mixture of hydrogen and of nitrogen and said gaseous carbon compound.

8. A method according to claim 1, wherein said reducing step is carried out by placing the aluminosilicate material in an enclosure, admitting into said enclosure a flow of gas comprising said mixture of hydrogen and nitrogen, and providing a carbon-containing solid material on the path of said gas flow inside the enclosure, upstream of the aluminosilicate material, whereby said gaseous carbon compound is produced by chemical reaction between hydrogen from the gas flow and the carbon-containing solid material.

9. The method according to claim 1, wherein said aluminosilicate material is clay.

10. The method according to claim 1, wherein said aluminosilicate material is in powder form.

11. The method according to claim 10, wherein said aluminosilicate material comprises a mixture of silica and alumina powders.

12. The method according to claim 1, wherein said aluminosilicate material is provided in the form of an aluminosilicate fiber.

13. The method of forming a Sialon-based ceramic coating on a refractory substrate, comprising the steps of:
  providing an aluminosilicate material in suspension in a liquid vehicle;
  depositing the suspension on the substrate;
  eliminating the liquid vehicle; and
  reducing the aluminosilicate material by a gas phase comprising a mixture of hydrogen and of nitrogen doped with a gaseous carbon compound, with said aluminosilicate material remaining substantially free of solid elemental carbon.

14. The method of forming a Sialon-based ceramic coating on fibers of a refractory fiber substrate, comprising the steps of:
  providing an aluminosilicate material in suspension in a liquid vehicle;
  impregnating the fiber substrate with the suspension;
  eliminating the liquid vehicle; and
  reducing the aluminosilicate material by a gas phase comprising a mixture of hydrogen and of nitrogen doped with a gaseous carbon compound, with said aluminosilicate material remaining substantially free of solid elemental carbon.

15. The method according to claim 14, wherein the steps of impregnating the fiber substrate, eliminating the liquid vehicle and reducing the aluminosilicate material are repeated.

16. The method according to claim 14, wherein the aluminosilicate material is a clay having a scaly structure.

17. The method according to claim 14, wherein the aluminosilicate material is kaolinite.

* * * * *

UNITED STATES PATENT AND TRADEMARK OFFICE
CERTIFICATE OF CORRECTION

PATENT NO. : 5,411,762
DATED : May 2, 1995
INVENTOR(S) : Jacques Thebault, et al.

It is certified that error appears in the above-indentified patent and that said Letters Patent is hereby corrected as shown below:

Column 2, line 2, "$Al_{203}$" should read --$Al_2O_3$--.

Column 3, line 25, "pans" should read --parts--.

Column 5, line 5, "horns" should read --hours--.

Column 6, line 11, "precursor" should read --material--.

Signed and Sealed this

Twenty-first Day of May, 1996

Attest:

BRUCE LEHMAN

*Attesting Officer*  *Commissioner of Patents and Trademarks*